United States Patent [19]

Pouillange

[11] Patent Number: 4,757,220
[45] Date of Patent: Jul. 12, 1988

[54] ELECTRODYNAMIC VERNIER MACHINE

[75] Inventor: Jean Pouillange, Gressy en France, France

[73] Assignee: Alsthom, Paris, France

[21] Appl. No.: 797,378

[22] PCT Filed: Feb. 26, 1985

[86] PCT No.: PCT/FR85/00033
§ 371 Date: Oct. 23, 1985
§ 102(e) Date: Oct. 23, 1985

[87] PCT Pub. No.: WO85/04058
PCT Pub. Date: Sep. 12, 1985

[30] Foreign Application Priority Data

Feb. 29, 1984 [FR] France ................................ 84 03154

[51] Int. Cl.⁴ ............................................. H02K 37/00
[52] U.S. Cl. ..................................... 310/49 R; 310/12; 310/162; 310/154; 310/266
[58] Field of Search .................. 310/266, 186, 49, 67, 310/162-164, 154, 156, 12-14

[56] References Cited

U.S. PATENT DOCUMENTS 2,790,098  4/1957  Nyssonen .
3,001,093  9/1961  Wilcox et al. ................. 310/266 X
3,303,369  2/1967  Erickson ......................... 310/266 X
4,190,779  2/1980  Schaeffer .
4,529,900  7/1985  Uzuka ............................. 310/266 X
4,663,551  5/1987  Weh et al. ....................... 310/12 X
4,668,883  5/1987  Nakagawa ....................... 310/12 X
4,675,582  6/1987  Hommes .......................... 310/12 X
4,695,777  9/1987  Asano ............................. 310/12 X
4,712,028 12/1987  Horber ............................. 310/12 X

FOREIGN PATENT DOCUMENTS

094978  11/1983  European Pat. Off. .
92958  12/1895  Fed. Rep. of Germany .
971680   2/1959  Fed. Rep. of Germany ...... 310/266
1556113 12/1968  France .

Primary Examiner—Mark O. Budd
Attorney, Agent, or Firm—Sughrue, Mion, Zinn, Macpeak, and Seas

[57] ABSTRACT

It comprises a stator (61) fitted with a polyphase winding (63) having 2p poles and comprising n teeth (75) per pair of poles, and a rotor provided with 2(n+1) magnets (65) per pair of poles, disposed facing an air gap (67) and radially magnetized in alternating directions (68 to 71).

11 Claims, 7 Drawing Sheets

ELECTRODYNAMIC VERNIER MACHINE

The present invention relates to an electrodynamic vernier machine.

An electrodynamic vernier machine is known of the type comprising:

two parts separated from each other by a gap, said parts being capable of moving relative to each other in a direction such that the average width of the gap remains constant; and means co-operating magnetically with a first one of said parts to create a magnetic field having 2p poles moving along said direction, p being an integer;

the first part being constituted by a magnetic frame comprising N teeth forming N slots, where N is an integer multiple of p, with the slots being open to the gap and being uniformly spaced along said direction; and the second part comprising M elements disposed along the said direction, where M is an integer multiple of p and differs from N by a number $T=t\times p$, where t is an integer which is small relative to N/p.

For example, a rotary motor of this type comprises a rotor mounted to rotate about an axis and a coaxial stator including N slots and N teeth. A polyphase winding is disposed in the slots creating a rotating field in the rotor. The M elements of the rotor are constituted by M teeth forming M slots, where M is greater than N. A magnet is fixed coaxially in the rotor in such a manner as to create a continuous magnetic field which passes through the gap and penetrates into the stator.

Generally speaking, known electrodynamic vernier machines are machines of the homopolar synchronous type whose two relatively movable parts comprise two respective rows of teeth facing each other, with the the number of teeth in one row being different from the number of teeth in the other row.

These machines have drawbacks. they must have a narrow gap which, by virtue of the magnetic circuit saturating, reduces the ampere-turns and consequently the machine torque. Further, the magnetic flux of these machines includes a homopolar component which does not produce any torque but which does contribute to saturating the magnetic circuit. As a result, the bulk of the machine may be prohibitive in certain applications.

The aim of the present invention is to mitigate these drawbacks.

The present invention provides an electrodynamic vernier machine of the above-mentioned type, characterized in that:

each of the M elements comprises two flux generators oriented in opposite directions, these elements interfering with the N teeth of the first part to create in said first part a magnetic field having 2p poles and capable of latching in synchronous manner with the 2p-pole moving field created by the said means which co-operate magnetically with the first part.

Several particular embodiments of electrodynamic vernier machines are described below by way of example with reference to the accompanying drawings, in which.

Figure 1:
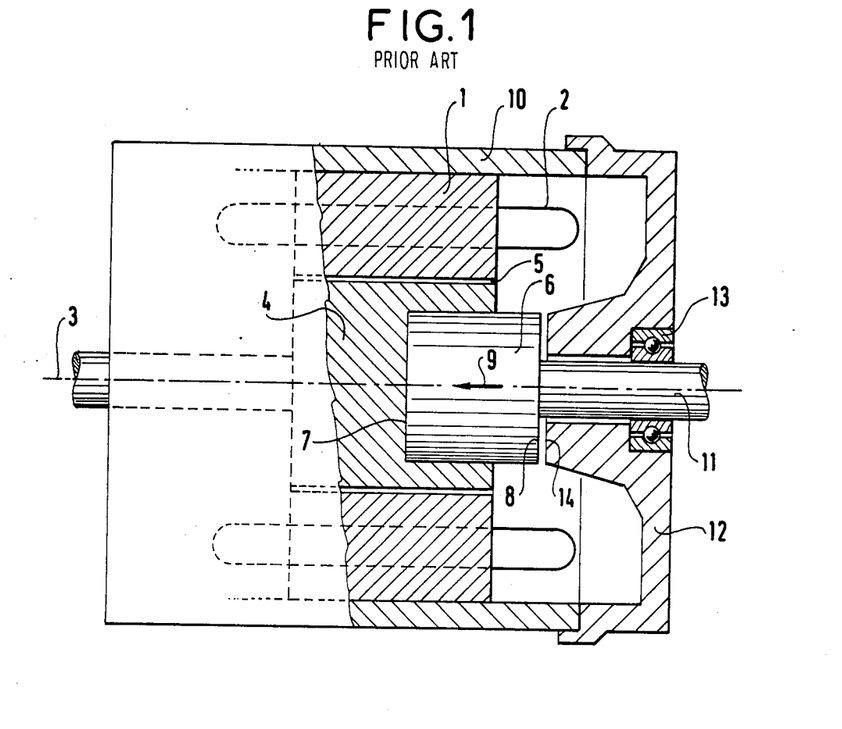
FIG. 1 is a diagram in partial longitudinal section through a vernier motor of known type.

The vernier motor shown in FIG. 1 comprises a stator 1 having a winding 12. The stator 1 is made up from an assembly of toothed magnetic laminations and the winding 2 is of the 2p-pole polyphase type and is lodged in the slots situated between the teeth of the stator. The stator 1 is circularly cylindrical about an axis 3 and is annular in section. A toothed rotor 4, likewise built-up from an assembly of magnetic laminations is mounted to rotate about the axis 3 and is disposed in the internal cylindrical volume of the stator 1, being separated therefrom by a cylindrical gap 5. A cylindrical magnet 6 is fixed coaxially in the rotor 4. The magnet 6 is fixed in the rotor 4 in such a manner that one plane face 7 of the magnet is situated inside the volume of the rotor 4 while the other plane face 8 of the magnet is situated outside said volume. The magnet 6 is magnetized in the direction 9 running from the face 8 to the face 7 in such a manner as to create a magnetic flux in the rotor 4 which passes through the gap 5 to penetrate into the stator 1. The stator is fixed in a magnetic shell 10. The rotor 4 and the magnet 6 are fixed on a shaft 8 capable of rotating about the axis 3 in two bearings which are mounted in end plates fixed to the shell 10. The end plate 12 is shown in section in FIG. 1 and includes a bearing 13 mounted on the shaft 11. The end plate 12 is made of magnetic steel and includes a surface 14 disposed close to and facing the face 8 of the magnet 6 so as close the magnetic flux circuit created by the magnet 6.

Figure 2:
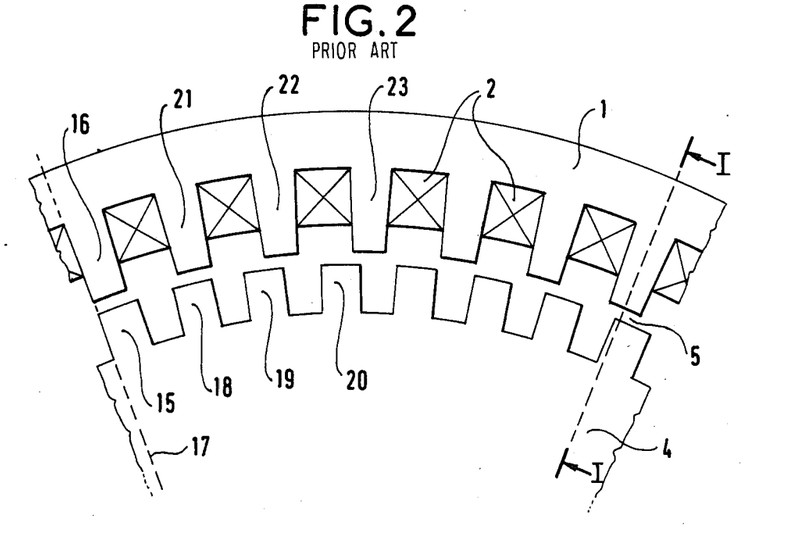
FIG. 2 is a cross-section showing a portion of the profile of the the teeth in the rotor and the stator of the motor shown in FIG. 1.

With reference to FIG. 2, the teeth of the stator 1 are uniformly distributed around the machine axis. The stator includes n tooth steps of equal size per pair of poles defined by the winding 2. As can be seen in FIG. 2, the teeth of the rotor are uniformly distributed about the axis but it has a higher number of teeth. For example, the rotor 4 comprises n+1 teeth per pair of poles. The position of the rotor relative to the stator in the figure is such that one side of a tooth 15 n the rotor is aligned with one side of a tooth 16 on the stator in radial direction 17. It can then be seen that the following teeth 18, 19, 20 on the rotor are offset relative to the corresponding teeth 21, 22, 23 on the stator. These offsets cause a variation in magnetic reluctance.

When a polyphase electric current is applied to the winding 2, the winding creates a 2p-pole field rotating about the axis 3. The motor shown in FIGS. 1 and 2 is of the synchronous type and the configuration of the excitation poles rotates at a speed equal to the speed of rotation of the rotating field, while the speed of rotation of the rotor, by virtue of the vernier effect, is equal to the quotient of the speed of rotation of the rotating field divided by a coefficient K.

It is recalled that where the stator includes n teeth per pair of poles and the rotor n+1 teeth per pair of stator poles, the coefficient K is equal to n+1. The speed reduction thus obtained is accompanied by an increase in torque relative to a conventional synchronous machine whose armature is transversed by the same continuous field, and the torque is multiplied by the factor K.

Generally speaking, the offsets vary in stages along the air gap. In the example of FIGS. 1 and 2, each stage corresponds substantially to one tooth step. Since the number of teeth is generally high, the stages are short and the offset varies substantially linearly along the gap.

Figure 3:
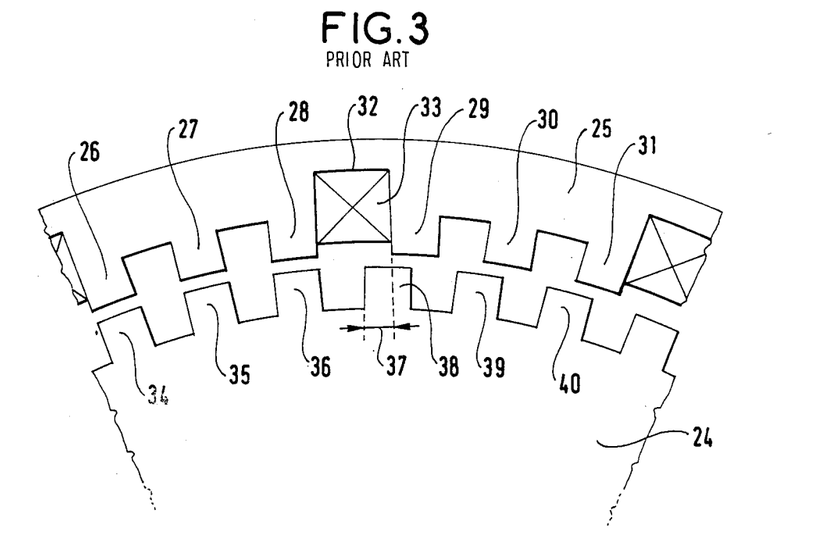
FIG. 3 is a cross-section showing a portion of another vernier motor of known type.

However, it is possible to make known vernier machines in which each successive offset stage corresponds to a plurality of teeth. For example, in the motor illustrated in FIG. 3, the rotor 24 comprises regularly distributed teeth, whereas the stator 25 comprises groups of teeth separated from one another by larger gaps. Each group comprises a plurality of teeth which are equally spaced at the spacing of the rotor. FIG. 3 shows a first stator group comprising teeth 26, 27 and 28 and a second stator group comprising teeth 29, 30 and 31. These two groups are separated from each other by a gap 32 in which a portion of the stator winding 33 is housed. In the position shown in the figure, the teeth 26, 27 and 28 are exactly opposite teeth 34, 35 and 36 on the rotor. The width of the gap 32 is such as to obtain an offset such as 37 between the teeth 29, 30 and 31 of the stator and the teeth 38, 39 and 40 of the rotor.

Figure 4:
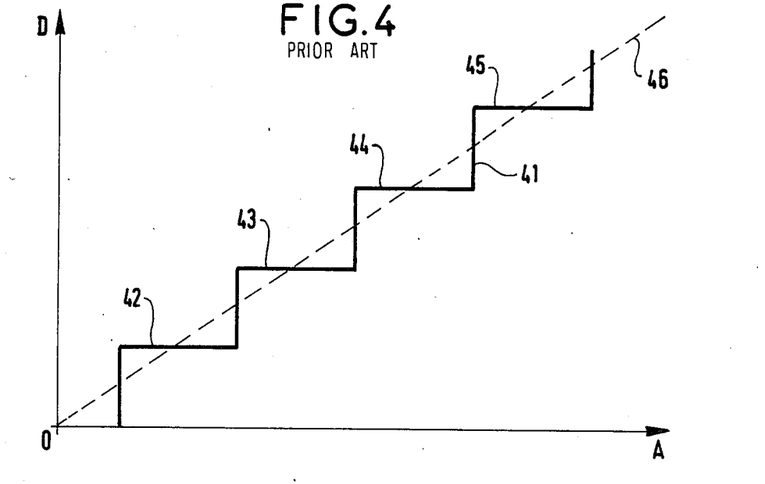
FIG. 4 is a graph showing the operation of the motor shown in FIG. 3.

FIG. 4 shows the variation 41 in the magnetic offset along the air gap in a machine of the type illustrated in FIG. 3. The position along the air gap is plotted along the X axis and is identified as an angle A relative to a reference axial plane, and the offset D is plotted along the Y axis. It can be seen that the curve 41 comprises successive stages 42, 43, 44 and 45. A linear average relationship 46 can be derived from the stepped relationship shown.

In practice, the two embodiments of vernier motors shown in FIGS. 2 and 3 operate in entirely similar manner. The coefficient K is equal to the number of rotor slots per pair of stator-winding poles when the stator offset per pair of poles is unity.

The operating principle of electrodynamic linear type machines is also applicable to vernier generators. In this case, for example, the rotor of the machines shown in FIGS. 2 or 3 is rotated and the electric current produced in the stator windings of these machines is collected.

This principle is also applicable to linear type vernier machines in which the air gap is not disposed around a cylindrical surface but rather along a plane surface separating two relatively movable parts. The moving part then moves relative to the fixed part along a straight line parallel to the air gap surface.

It is also possible to make electrodynamic linear type machines operate as rotary stepdown devices.

Figure 5:
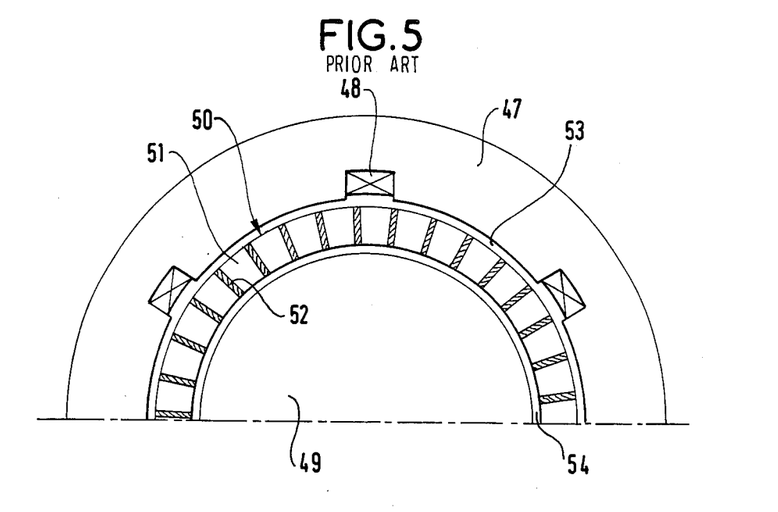
FIG. 5 is a cross-section showing a portion of a step-down vernier of known type.

A known type of stepdown device is shown in FIG. 5 and comprises a first rotor 47 which is annular in shape. This rotor is not toothed but carries a continuous winding 48 having 2p-poles. The stepdown device further includes a second rotor 49 which is cylindrical and coaxial with the first. This rotor comprises n+1 teeth per pair of poles (not shown), analogous to those of the rotor of the motor shown in FIG. 2. Between the rotors 47 and 49 there is a stator 50 which is annular in shape and coaxial therewith. The stator comprises n radial teeth 51 per pair of poles, and these teeth are separated from one another by separators 52 made of a magnetic material. The stator 51 is separated from the rotors 47 and 49 by cylindrical air gaps 53 and 54.

When the rotor 47 is rotated at a speed v and when the winding 48 is supplied with DC, a rotating field is set up which passes radially through the stator 50 and which penetrates into the second rotor 49. It can thus be seen that the assembly 47-53-50 is equivalent to the stator of the motors shown in FIGS. 2 and 3. Under such conditions, if the rotor 49 has n+1 teeth per pair of poles of the winding 48, the rotor 49 will rotate at a speed v/(n+1).

Figure 6:
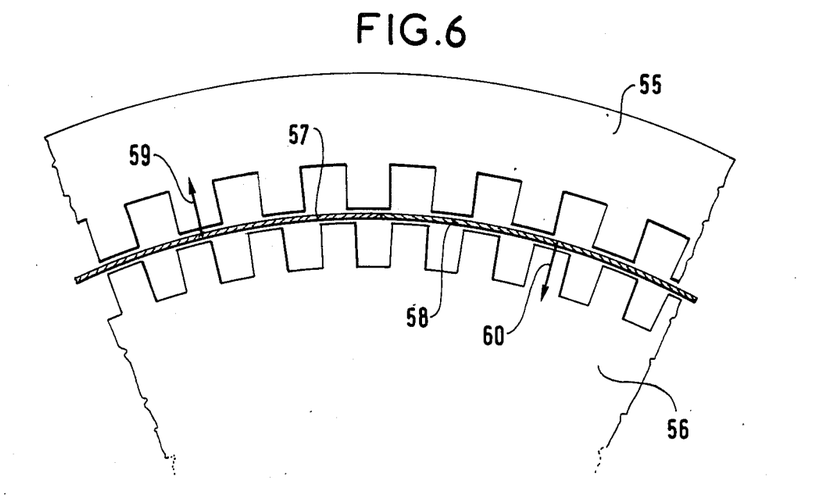
FIGS. 6 to 12 are cross-sections showing portions of seven different vernier type motors in accordance with the present invention.

FIG. 6 shows another type of known vernier stepdown device comprising a stator 55 and a rotor 56 which are coaxial and which have teeth. The rotating field is produced in this case by another coaxial rotor 57 disposed in the air gap situated between the stator 55 and the rotor 56. The rotor 57 includes 2p magnets such as 58 which are juxtaposed around the air gap and whose directions of radial magnetization 59 and 60 alternate so as to create a rotating field having 2p-poles. If the stator 55 possesses n slots per pair of poles and if the rotor 56 possesses n+1 slots per pair of poles, driving the rotor 57 at a speed v causes the rotor 56 to rotate at a speed v/(n+1).

Figure 7:
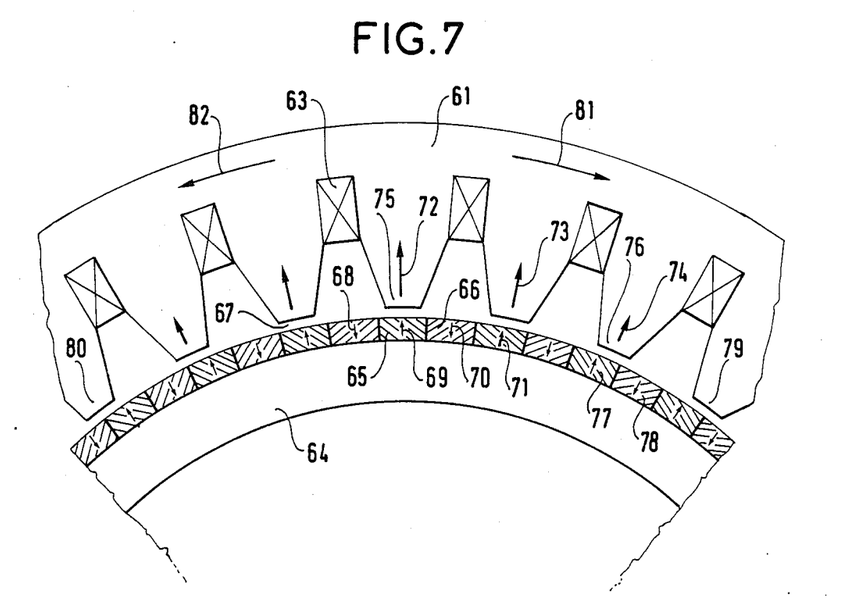

FIG. 7 shows an electric vernier motor in accordance with the invention. This motor comprises a stator including a magnetic frame 61 formed by an assembly of magnetic laminations. The frame is circularly cylindrical about an axis (not shown) and has an annular right cross-section. It includes teeth and slots opening to the inside cylindrical face of the frame. A polyphase winding 63 having two field poles is housed in the slots. The stator frame 61 comprises n per pair of poles which are regularly spaced, giving a total of $N=np$ teeth. A cylindrical rotor which is symmetrical about the axis and is mounted to rotate thereabout is disposed in the volume delimited by the internal cylindrical surface of the stator. The rotor comprises a cylindrical magnetic yoke 64 which is annular in shape, and substantially rectangular magnets such as 65 and 66 which are fixed to the outer cylindrical surface of the yoke. The long dimension of the magnets extends parallel to the axis, and the length of the magnets is substantially equal to the length of the iron in the stator frame. The width of the magnets is oriented tangentially relative to the outer cylindrical surface of the yoke 64, and their thickness is oriented radially. The magnets are juxtaposed on the outer cylindrical surface of the yoke in such a manner that the outer cylindrical surface of the rotor is separated from the inner cylindrical surface of the stator by an air gap 67. The magnets may be fixed to one another and to the yoke 64 by glue, or example. The magnets must be electrically insulated from one another and from the yoke if they are made of conductive material.

The successive magnets around the air gap are magnetiized regularly in such a manner as to produce magnetic flux passing through the air gap in alternating directions such as 68, 69, 70, and 71. The rotor includes a number m of pairs of magnets per pair of stator poles, where the number m is different from the number n of stator teeth per pair of poles. In the case shown in FIG. 7, the number m is equal n+1. The rotor thus comprises a total $M=2(n+1)p$ magnets.

Arrows such as 72, 73 and 74 are marked in the stator teeth to indicate direction of the continuous magnetic flux passing through the stator due to the magnets. The length of each arrow is proportional to the intensity of the flux. Thus, the arrow 72 situated in the tooth 75 corresponds to a maximum flux intensity as created by the magnet 65 which is magnetized in the direction 69 of the arrow 72, since the axis of the tooth 75 passes through the middle of the width of the magnet. In contrast, the arrow 74 situated in the tooth 76 corresponds to a lesser flux intensity since only a portion of the surface of the tooth 76 facing the rotor overlaps the magnet 77 which is magnetized parallel to the arrow 74, while another smaller portion of the tooth 76 overlaps the magnet 78 which is magnetized in the opposite direction to the arrow 74. Finally, the teeth 79 and 80 on the stator whose axes are situated in alignment with the junction between two magnets, do not receive any flux from the rotor magnets.

It is clear, that the stator teeth which are not visible in FIG. 7 but which are situated immediately to the left and to the right of the figure receive continuous flux from the magnets. The profile of the flux is analogous to that shown by the arrow 72 to 74, but it is radially directed in the opposite direction. The rotor thus creates a continuous magnetic field in the stator with flux loops being closed in the direction of arrows 81 and 82 behind the slots. The continuous field produced in the rotor by the magnets is of an intensity which varies around the air gap in accordance with periodic curve. The period of this curve corresponds to n stator teeth and to n+1 rotor teeth. It is thus a 2p-pole heteropolar continuous field.

The winding 63 in the stator creates an alternating 2p-pole field in the rotor with the flux path being looped by the yoke 64. The machine shown in FIG. 7 is thus a motor of the synchronous type. Given the difference between the number of stator teeth per pair of poles (n) and the number pairs of magnets per pair of poles (n+1) on the rotor, the motor is of the vernier type: when the stator winding 63 is fed with polyphase current so as to create a field rotating about the axis, the rotor rotates at a speed which is (n+1) times less than the speed of the rotating field.

Figure 8:
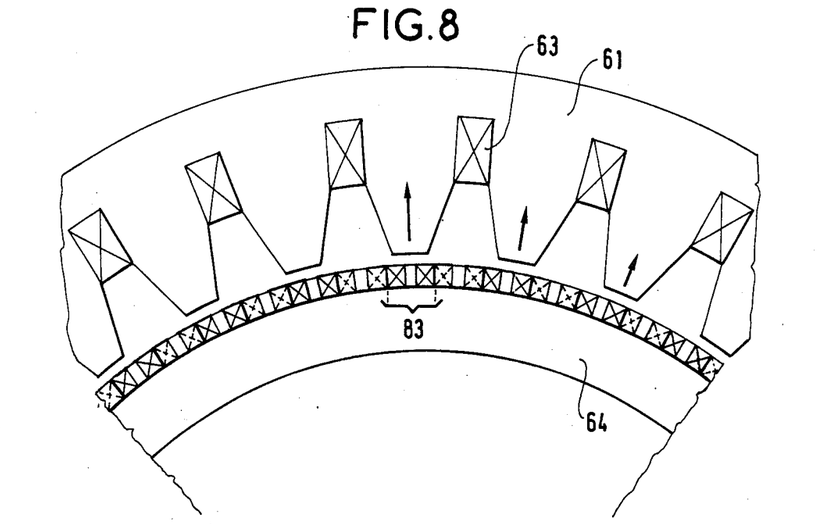

The electric vernier motor shown in FIG. 8 comprises a stator and a rotor having a yoke 64. The stator and the yoke 64 are identical to the stator and the yoke of the motor shown in FIG. 7. However, in FIG. 8, the rotor includes electric windings such as 83 fixed to the outer cylindrical surface of the yoke. There are as many windings as there were magnets in the FIG. 7 motor, and they are disposed around the air gap so as to create flux passing through the air gap in opposite directions.

Naturally, the rotor then includes a system of slip rings and brushes for supplying the windings with DC. The windings then perform an identical role to that of the magnets in FIG. 7. The operation of the motor shown in FIG. 8 is thus identical to that of the motor shown in FIG. 7.

Figure 9:
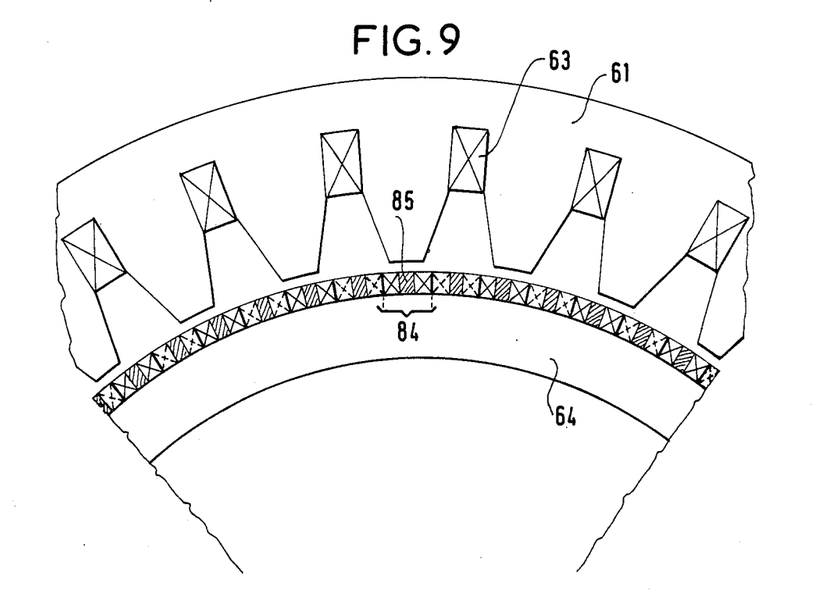

The electric vernier motor shown in FIG. 9 is analogous to that shown in FIG. 8. However, the electric windings 84 on the FIG. 9 rotor include magnetic cores such as 85. These cores of magnetic steel are disposed regularly and are fixed to the yoke 64.

Figure 10:
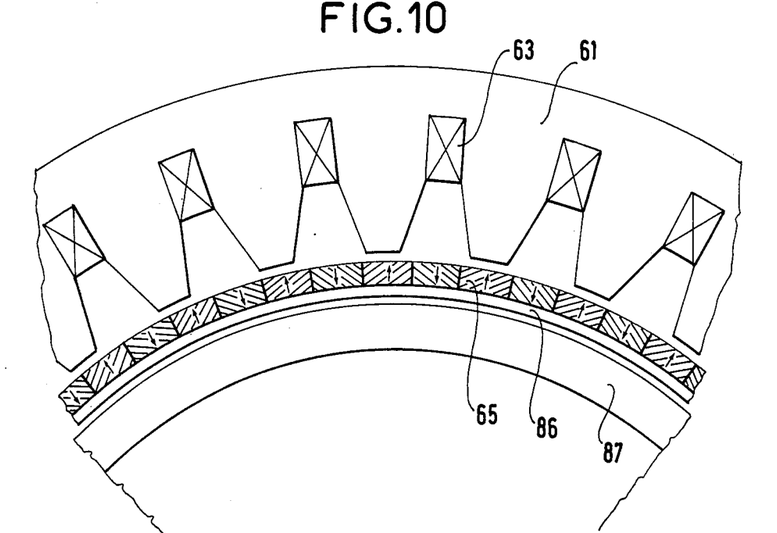

The electric vernier motor shown in FIG. 10 includes a stator and a rotor fitted with magnets 65 like the motor illustrated in FIG. 7. However, in FIG. 10 the rotor yoke is divided into two portions: a thin portion 86 capable of supporting the magnets, and a coaxial inner portiton 87 which is separated from the portion 86 by an additional air gap. The inner portion 87 is fixed and serves to loop the magnetic paths. This disposition gives rise to a loss of ampère-turns in the additional air gap, but has the advantage of reducing the inertia of the rotor.

Figure 11:
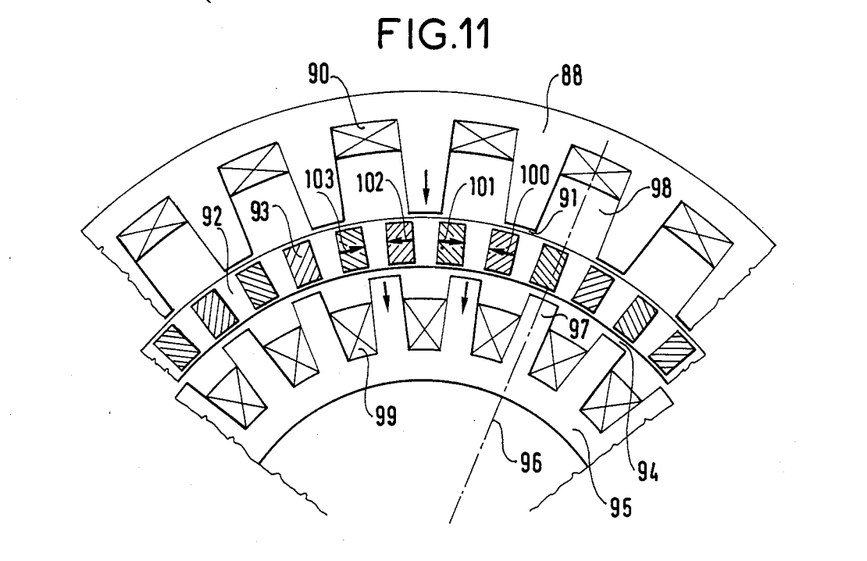

The electric vernier motor shown in FIG. 11 comprises a stator having an annular magnetic frame 88 whichis cylindrical about an axis (not shown). The frame 88 includes teeth and slots with a polyphase winding 90 disposed in the slots and suitable for creating a 2p-pole field rotating about the axis. The frame 88 includes n teeth and n slots per pair of poles, the teeth and the slots being uniformly distributed about the axis.

The inside cylindrical surface of the frame 88 is separated from a coaxial annular rotor by an air gap 91 into which the slots in the frame open out. The rotor comprises an annular magnetic frame constituted by a stack of laminations, for example. This frame comprises, per pair of stator poles, 2(n+1) radial sectors 92 between which magnets 93 are disposed. These sectors are uniformQy distributed around the axis.

The inside cylindrical surface of the rotor is separated by another air gap 94 from another fixed magnetic frame 95 which is annular and coaxial. The frame 95 comprises n teeth per pair of poles, which teeth form n slots opening out into the air gap 94. The teeth of the frames 88 and 95 are disposed in such a manner that the axial plane of symmetry 96 of any tooth 97 on the frame 95 coincides with the axial plane of symmetry of slot 98 in the frame 88. The slots in the frame 95 contain a polyphase winding 99 suitable for creating a rotating field identical to that created by the winding 90.

The electric vernier motor shown in FIG. 11 operates as follows. The magnets 93 are disposed in such a manner as to produce tangential magnetic flux oriented alternately in one direction and then the other as indicated by arrows 100 to 103. This flux is concentrated in the radial sectors of the rotor which directs it alternately in a preferential manner towards the frames 88 or 95. A continuous magnetic field having 2p poles and linked to the rotor is thus created in the two frames of the stator. Given the difference between the numbers of pairs of radial sectors in the rotor and the numbers of teeth in each frame of the stator, the speed of rotation of the rotor n+1 is smaller than the speed of rotation of the rotating field created by the windings on the two frames of the stator.

Figure 12:
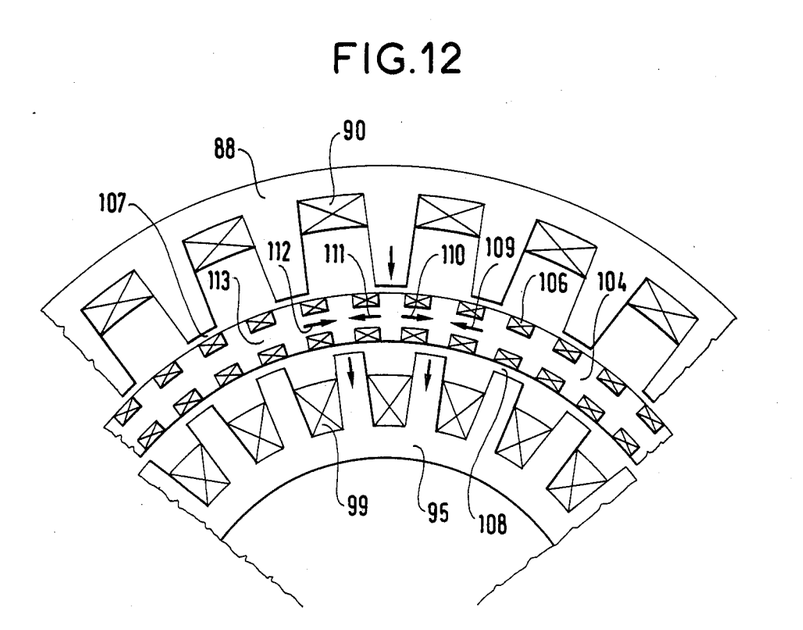

The electric vernier motor shown in FIG. 12 comprises a stator having two toothed frames 88 and 95 fitted with respective polyphase windings 90 and 92 eacg having 2m poles, and this stator is identical to the stator of the motor shown in FIG. 11. Each stator frame is thus provided with n teeth per pair of poles.

The rotor of the FIG. 12 motor comprises an annular magnetic frame comprising 2(n+1) radial sectors 104 per pair of poles and uniformly distributed around the axis. Windings 106 are disposed between these sectors. The rotor also includes a set of brushes and slip rings (not visible in the figure) for supplying DC to the windings. The rotor is separated from the two stator frames 88 and 95 by respective air gaps 107 and 108.

The windings 106 are disposed in such a manner as to create tangential magnetic flux following arrows 109 to 112 between the radial sectors and oriented in alternating directions. This flux is concentrated in the radial sectors which direct it towards the frames 88 and 95 in alternation. Preferably, the magnetic frame of the rotor also comprises tangential cores 113 interconnecting the radial sectors. The windings 106 are wound around the tangential cores.

Naturally the operation of the electric vernier motor shown in FIG. 12 is completely analogous to that of the motor shown in FIG. 11.

Although the vernier machines in accordance with the invention described above with reference to FIGS.

7 to 12 are rotary motors having teeth at a regular pitch, it is also possible to make machines in accordance with the invention comprising groups of teeth, which groups are equal to one another and progressively offset. It is also possible to make machines in accordance with the invention which operate as generators, as stepdown devices, and also electrodynamic machines which operate by linear displacement.

Electrodynamic vernier machines in accordance with the invention are of the heteropolar type and have the advantage, over prior art vernier machines of less bulk and less inertia.

By way of example, it is possible to make a motor of the type shown in FIG. 7 having a maximum torque of 300 Nm and a permanent torque of 220 Nm, with a speed of rotation of 1 to 2 revolutions per second and a weight of 22 Kg. The weight of a motor of the type illustrated in FIG. 11 and having the same performance is about 13 Kg.

Vernier machines in accordance with the present invention may be applied in particular in the field of robotics for making motors that rotate slowly and are of small inertia, inversely, it may also be used for making compact motors capable of providing very high torque.

I claim:

1. An electrodynamic vernier machine comprising:
   two parts separated from each other by a gap, said parts being capable of moving relative to each other in a direction such that the average width of the gap remains constant; and
   means co-operting magnetically with a first one of said parts to create a magnetic field having 2p poles moving along said direction, p being an integer;
   the first part being constituted by a magnetic frame comprising N teeth forming N slots, where N is an integer multiple of p, with the slots being open to the gap and being uniformly spaced along the said direction; and
   the second part comprising M elements disposed along the said direction, where M is an integer multiple of p and differs from N by a number $T = t \times p$, where t is an integer which is small relative to N/p;
   characterized in that each of the M elements comprises two flux generators (65-66) oriented in alternating directions (69-70), said elements interfering with the N teeth (75) of the first part (61) to create a 2p-pole magnetic field (72, 73, 74) in said first part being capable of synchronously latching onto the 2p-pole moving magnetic field created by the said means (63) which co-operate magnetically with the first part (61).

2. A machine according to claim 1, characterized in that the said flux generators are magnets (65) disposed opposite the frame (61) and magnetized perpendicularly to the air gaps.

3. A machine according to claim 1, characterized in that the said flux generators comprise electric windings (83) disposed opposite the frame (61), with the axes of these windings being perpendicular to the air gap, and means being provided to supply DC to these windings (83).

4. A machine according to claim 3, characterized in that each of the said M elements also comprises two magnetic cores (85) whose axes are perpendicular to the air gap, the electrical windings (84) being disposed axially about said cores (85).

5. A machine according to claim 1, characterized in that the said second partis a circularly symmetrical cylinder about an axis, being of annular right section and rotatable about the axis, and the frame (61) is a fixed, circularly symmetrical cylinder about the axis, of annular right cross-section and coaxially disposed around said second part,
   the said means for creating a moving magnetic field comprising a polyphase winding (63) disposed in the slots of the frame (61), the moving field being a field rotating about the axis; and
   the machine further comprising a cylindrical yoke (64) which is disposed coaxially inside the internal cylindrical volume of said second part, said yoke co-operating magnetically with said second part in such a manner as to loop the path of the magnetic flux created by the said flux generators (65) and by the said winding (63).

6. A machine according to claim 5, characterized in that the yoke (87) is fixed and separated from the second part by another air gap.

7. A machine according to claim 5, characterized in that the yoke (64) is fixed to inside cylindrical surface of the second part.

8. A machine according to claim 1, characterized in that the said second part is a circularly symmetrical cylinder about an axis of annular right cross-section and rotatable about the axis, the frame is a fixed first frame (88) which is cylindrical, annular in shape and disposed coaxially around the second part, the air gap separating the first frame from the second part being a first air gap (91),
   the machine further comprising a second frame (95) which is fixed, cylindrical, annular in shape,anddisposed coaxially inside the interior cylindrical volume of the second part and being separated therefrom by a second air gap (94), the second frame comprising N teeth forming N slots opening out into the second air gap, the axial plane of symmetry (96) of each tooth (9) of either frame (95) coinciding with the axial plane of symmetry of a slot (98) of the other frame (88);
   the said means for creating a moving magnetic field comprising a first polyphase winding (90) disposed in the slot (98) ofthe first frame (88) and a second polyphase winding (99) disposed in the slots of the second frame (95), the slipping field being a field rotating about the axis; and
   each of M elements of the second part further comprising two radial sectors (92) of a magnetic frame, the said 2M flux generators being disposed beween the radial sectors in such a manner as to create tangentially directed magnetic flux, said flux being directed by said radial sectors alternately towards the first (88) and the second (95) stator frames via the first (91) and second (94) air gaps, the said continuous magnetic fields being formed in the first and second stator frames.

9. A machine according to claim 8, characterized in that the said flux generators are magnets (93).

10. A machine according to claim 8, characterized in that the said flux generators are electrical windings (106) and in that the magnetic frame of the second part comprises tangential cores (113) interconnecting the radial sectors (104), with the windings (106) being disposed around said cores (113).

11. A machine according to claim 1, characterized in that the first (61) and second parts are cylindrical and circularly symmetrical about a common axis, with the relative displacement of these parts being rotation about said axis, the said moving magnetic field then being a magnetic field rotating about the said axis, the number N of slots in the frame (61) being equal to np, where n is an integer, and the number M of the said elements of the second part is equal to (n+1)p, the said continuous magnetic field (72 to 74) being a 2p-pole field, and the speed of rotation of the second part (65) relative to the stator frame (61) being n+1 times less than the speed of the rotating field.

* * * * *